(12) United States Patent
Tobin et al.

(10) Patent No.: US 7,162,017 B1
(45) Date of Patent: Jan. 9, 2007

(54) SYSTEM AND METHOD FOR DETERMINING AN OPTIMAL THRESHOLD FOR INCREASING TELEPHONE LINE CAPACITY AND FOR EVALUATING LINE MANAGEMENT POLICIES

(75) Inventors: Roger L. Tobin, Arlington, MA (US); James H. Drew, Boxborough, MA (US); Leslie D. Servi, Lincoln, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1001 days.

(21) Appl. No.: 10/154,313

(22) Filed: May 23, 2002

(51) Int. Cl.
*H04M 15/00* (2006.01)
*H04M 7/00* (2006.01)

(52) U.S. Cl. .................... 379/112.05; 379/112.03; 379/112.06; 379/221.07

(58) Field of Classification Search .......... 379/112.01, 379/112.03, 112.04, 112.05, 112.06, 112.1, 379/32.01, 32.02, 221.03, 221.04
See application file for complete search history.

(56) References Cited

U.S. PATENT DOCUMENTS

| | | | |
|---|---|---|---|
| 4,744,027 A * | 5/1988 | Bayer et al. .................... 705/7 |
| 5,285,494 A * | 2/1994 | Sprecher et al. ............ 455/423 |
| 5,430,717 A | 7/1995 | Fowler et al. ............. 370/58.2 |
| 5,920,571 A | 7/1999 | Houck et al. ............... 370/458 |
| 6,038,227 A | 3/2000 | Farris et al. ................ 370/354 |
| 6,049,599 A | 4/2000 | McCausland et al. ....... 379/111 |
| 6,058,103 A * | 5/2000 | Henderson et al. ......... 370/254 |
| 6,421,435 B1 * | 7/2002 | Bastien et al. .............. 379/133 |
| 6,839,745 B1 * | 1/2005 | Dingari et al. .............. 709/219 |
| 2002/0126823 A1 * | 9/2002 | Kumar et al. .......... 379/221.06 |

* cited by examiner

*Primary Examiner*—Quoc Tran

(57) ABSTRACT

A method determines a threshold for increasing telephone line capacity in a telecommunications system. The method includes receiving a group of parameters that relate to at least one of a telephone line management policy (1030), environmental parameters (1020), and cost parameters (1010) and determining the threshold based on the received parameters.

22 Claims, 11 Drawing Sheets

US 7,162,017 B1

SYSTEM AND METHOD FOR DETERMINING AN OPTIMAL THRESHOLD FOR INCREASING TELEPHONE LINE CAPACITY AND FOR EVALUATING LINE MANAGEMENT POLICIES

FIELD OF THE INVENTION

The present invention relates generally to networks and, more particularly, to a system and method for determining an optimal threshold at which telephone line capacity should be expanded and for evaluating line management policies.

BACKGROUND OF THE INVENTION

When a business or residence is vacated, the primary telephone line for the business or residence may be put into an express dialtone (EDT) status. While in an EDT status, the line may have a dialtone and access to 911 and the telephone service provider. EDT lines allow for fast, low cost service startup for new customers. EDT lines, however, require all the capital equipment of active lines, but produce no revenue. As a result, as line growth utilizes spare capacity, the presence of these EDT lines may prematurely trigger capacity expansion projects thereby straining capital budgets. To combat this, EDT line management policies were adjusted so that older EDT lines (i.e., EDT lines that have been in existence for an extended period of time) were broken (or dismantled) to allow these lines to be used for other purposes. By decreasing the number of existing EDT lines, however, the expense of hooking up new customers increases.

Conventional approaches to determine when to break EDT lines are based on educated guesses. Because these educated guesses are not optimal, telecommunications service providers incur more costs than necessary.

Therefore, there is a need to quantify the trade-off between capital and expense for telecommunications inventory management policies.

SUMMARY OF THE INVENTION

A system and method, consistent with the present invention, address this and other needs by providing a mechanism that evaluates line management policies and determines the optimal threshold at which additional telephone lines should be added.

In accordance with the purpose of the invention as embodied and broadly described herein, a method determines a threshold for increasing telephone line capacity in a telecommunications system. The method includes receiving a group of parameters that relate to at least one of a telephone line management policy, environmental parameters, and cost parameters and determining the threshold based on the received parameters.

In another implementation consistent with the present invention, a graphical user interface for providing data regarding telephone line deployment is disclosed. The graphical user interface includes a first section configured to allow a user to enter cost parameters, a second section configured to allow a user to enter environmental parameters, a third section configured to allow a user to enter data relating to a telephone line management policy, a fourth section configured to output cost results, a fifth section configured to output customer turnover results, and a sixth section configured to output outlay implication results.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

A system and method, consistent with the present invention, provide line capacity thresholds for line management policies. By considering economic and cost parameters, an optimal threshold can be determined.

Exemplary Network

Figure 1:
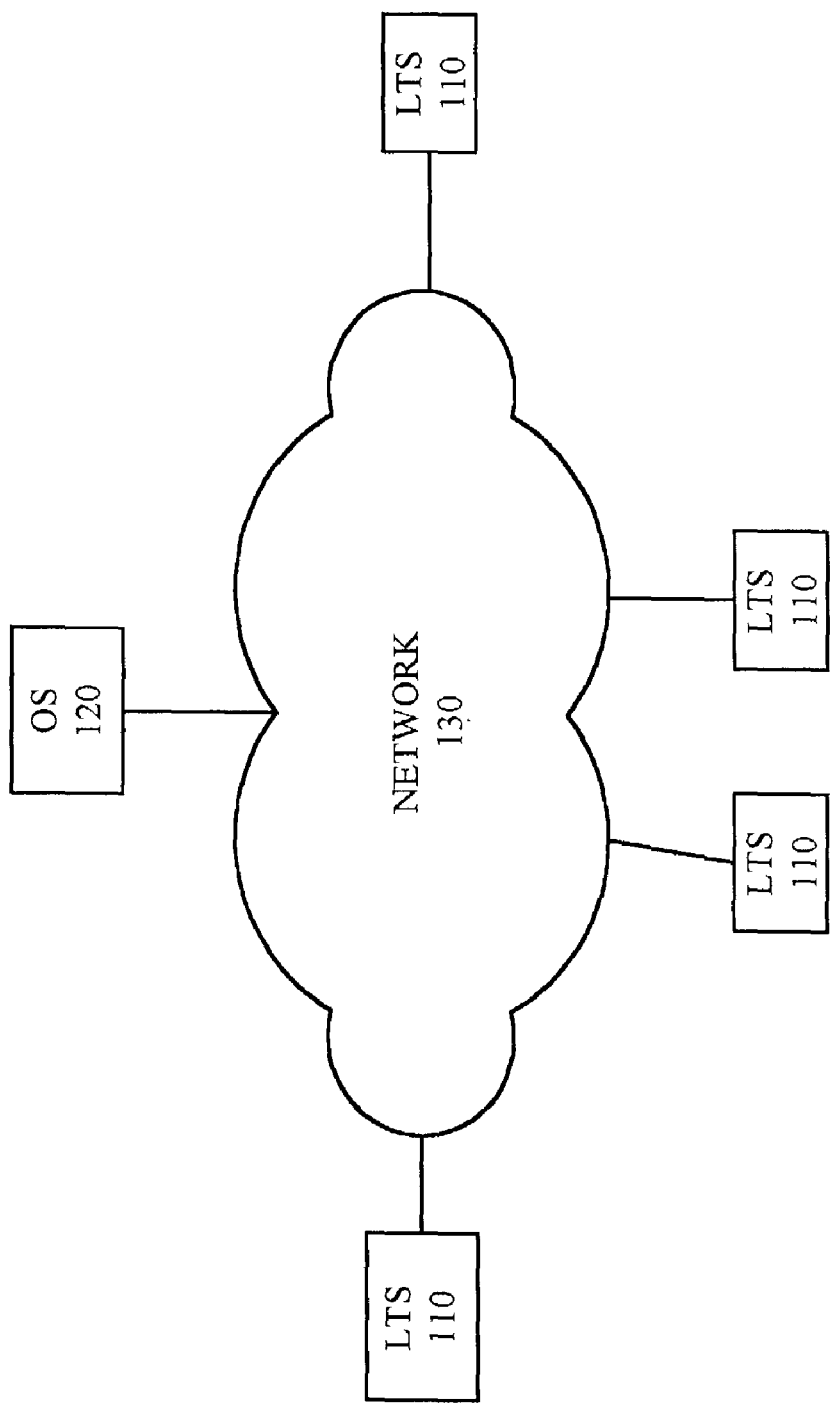
FIG. 1 illustrates an exemplary network in which a system and method, consistent with the present invention, that determine an optimal threshold for increasing telephone line capacity may be implemented.

FIG. 1 illustrates an exemplary network 100 in which a system and method, consistent with the present invention, that determine an optimal threshold for increasing telephone line capacity may be implemented. In FIG. 1, network 100 includes a group of local telephone systems (LTSs) 110 connected to an optimization system (OS) 120 through a network 130. The number of systems illustrated in FIG. 1 is shown for simplicity. A typical network 100 may include a greater or lesser number of local telephone systems and optimization systems.

Each local telephone system 110 provides telephone communications to a group of subscribers (not shown). Optimization system 120 may include one or more optimization systems capable of determining an optimal threshold at which telephone line capacity should be increased for a given inventory management policy. In practice, optimization system 120 may be located within a local telephone system (e.g., at the central office) or may be separate therefrom. As will be described in more detail below, optimization system 120 may use information from an associated database in order to optimize the tradeoff between capacity-related capital costs and service provisioning expenses for a given inventory management policy.

Network 130 may include any type of conventional network, or networks, through which voice and data communications may be transmitted. For example, network 130 may include a Public Switched Telephone Network (PSTN), a data network, such as the Internet, an intranet, a local area network (LAN), a wide area network (WAN), a metropolitan area network (MAN), etc., or a combination thereof.

Exemplary Local Telephone System

Figure 2:
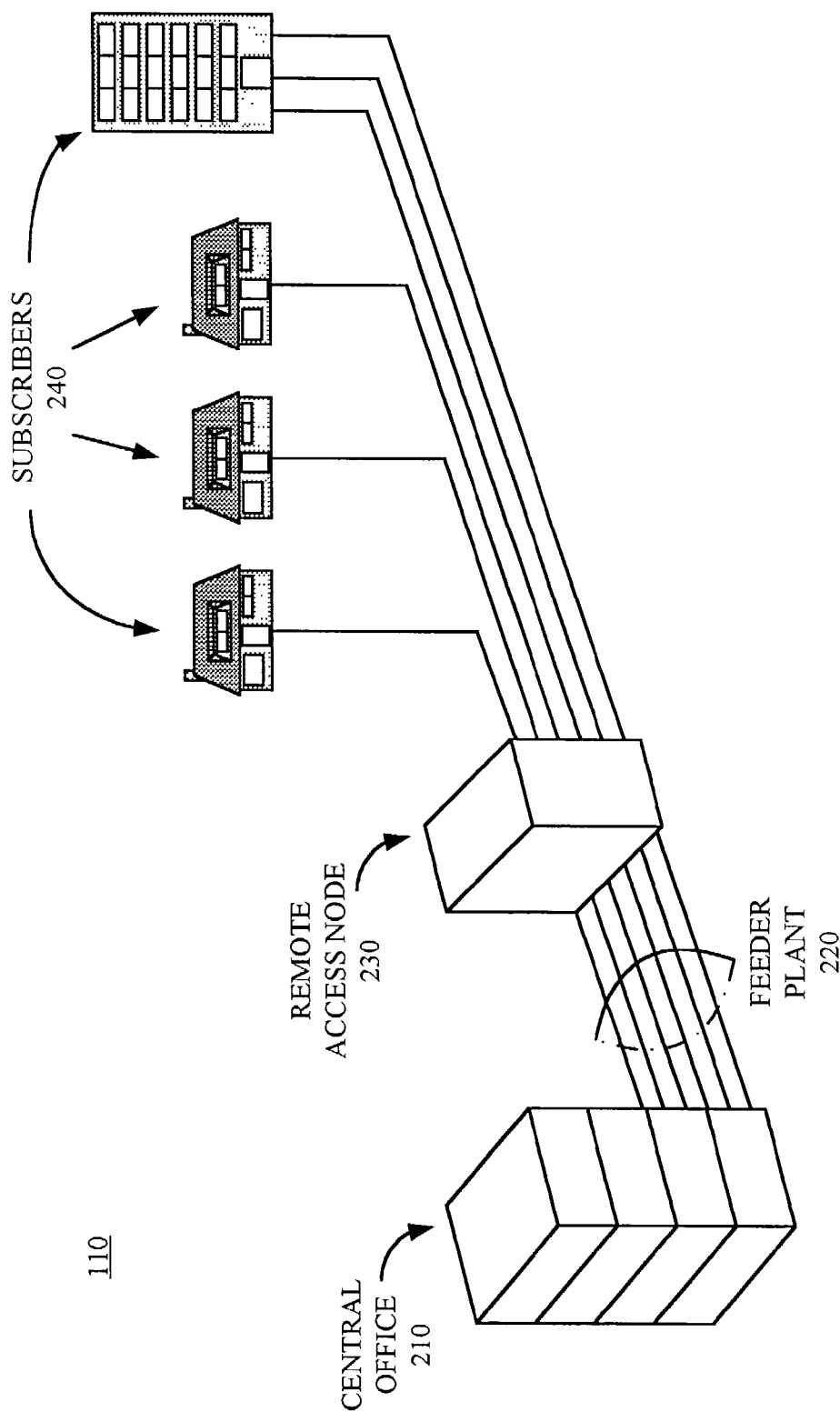
FIG. 2 illustrates an exemplary local telephone system consistent with the present invention.

FIG. 2 illustrates an exemplary local telephone system 110 consistent with the present invention. In FIG. 2, local telephone system 110 may include a group of subscriber locations 240 that are connected to a central office 210 by a feeder plant 220 and a remote access node 230.

Central office 210 may include a conventional local telephone company switching center that receives and directs telephone calls to their appropriate destinations. Central office 210 may also provide customer services, such as call waiting and call forwarding. While central office 210 is illustrated as being connected to a single remote access node 230, a typical central office 210 may be connected to multiple remote access nodes 230 via one or more different feeder plants 220.

Feeder plant 220 may represent that section of a local telephone system 110 radiating from central office 210 to a remote access node 230. Much of feeder plant 220 includes a cable containing a number of copper wire pairs (e.g., a small feeder cable may contain 25 copper wire pairs while a large cable may contain 3000 copper wire pairs) or fiber optic strands.

Remote access node 230 may include a conventional remote access node that provides a connection between central office's 210 feeder plant 220 and subscriber locations 240. Remote access node 230 may include a group of line cards (not shown), each providing a transmitting/receiving port for a particular protocol.

Subscriber locations 240 may include customer locations that have subscribed to telephone service. These customers may include homeowners, business owners, and the like.

Several levels of connectivity may exist between central office 210 and subscriber locations 240. Four such levels are active telephone service, express dialtone (EDT), left-in-jumper (LIJ), and left-in-frame (LIF). An EDT level of connectivity generally includes the presence of all components required for an active telephone line (e.g., feeder plant, a line card, a telephone number, switching components, etc.). A LIJ level of connectivity may include all components except for the line card and telephone number. A LIF level of connectivity may have connectivity from central office 210 to subscriber locations 240, but may include no switching components, line card, or telephone number.

The number of components illustrated in FIG. 2 is provided for simplicity. In practice, a typical local telephone system 110 may include a larger number of central offices 210, feeder plants 220, remote access nodes 230, and subscribers 240.

Exemplary Optimization System Configuration

Figure 3:
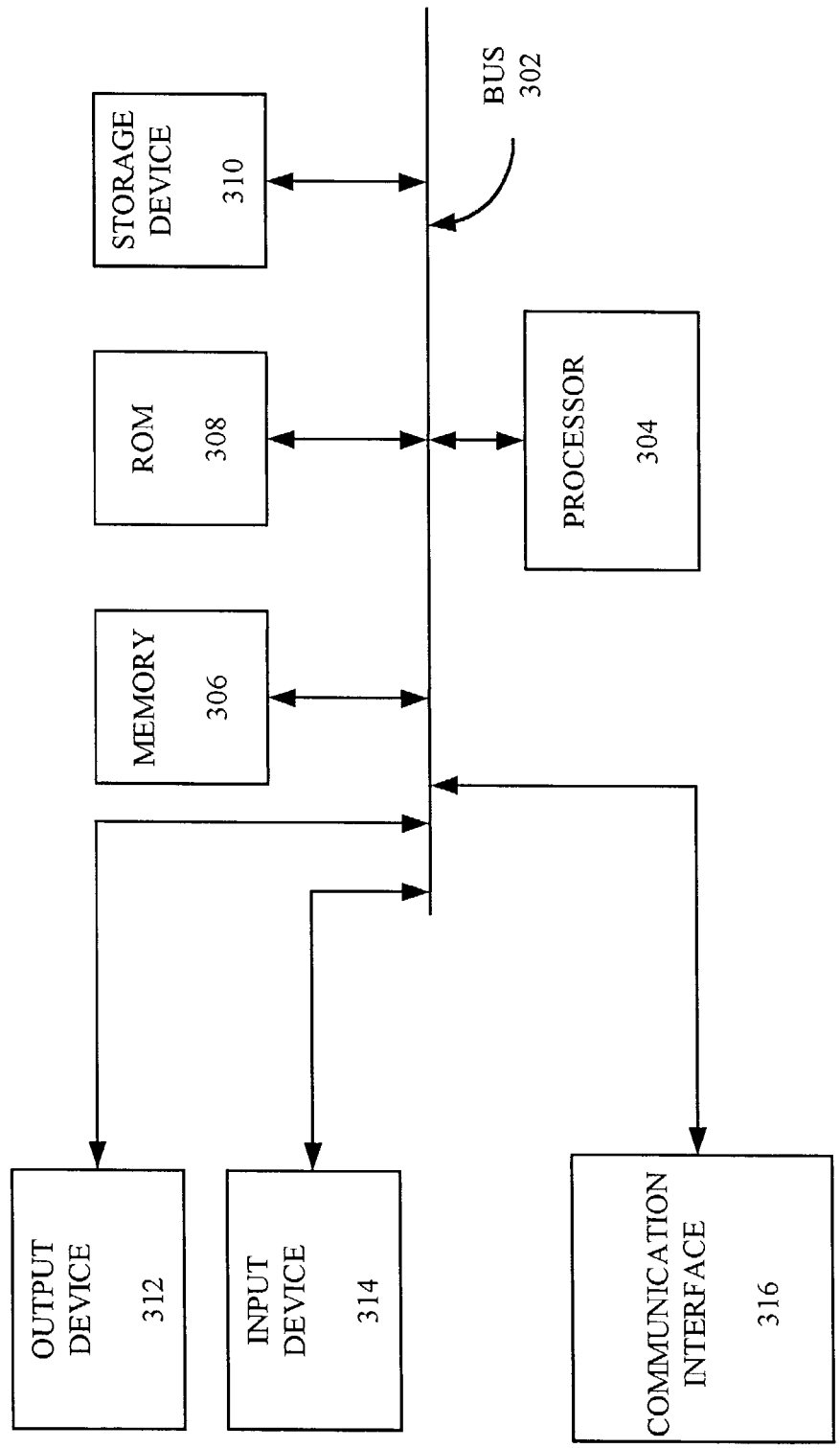
FIG. 3 illustrates an exemplary system, consistent with the present invention, that determines an optimal capacity expansion threshold for a local telephone system.

FIG. 3 illustrates an exemplary system 120, consistent with the present invention, that determines an optimal telephone capacity expansion threshold for a local telephone system, such as local telephone system 110. As described above, system 120 may be associated with a central office 210 or may be separate therefrom. System 120 may include a bus 302, a processor 304, a memory 306, a read only memory (ROM) 308, a storage device 310, an output device 312, an input device 314, and a communication interface 316. Bus 302 may include one or more conventional buses that permit communication among the components of system 120.

Processor 304 may include any type of conventional processor or microprocessor that interprets and executes instructions. Memory 306 may include a random access memory (RAM) and/or another dynamic storage device that stores information and instructions for execution by processor 304. Memory 306 may also be used to store temporary variables or other intermediate information during execution of instructions by processor 304.

ROM 308 may include a conventional ROM device and/or another static storage device that stores static information and instructions for processor 304. Storage device 310 may include a magnetic disk or optical disk and its corresponding drive and/or some other type of magnetic or optical recording medium and its corresponding drive for storing information and instructions.

Output device 312 may include one or more conventional mechanisms that output information to an operator, including a display, a printer, a speaker, etc. Input device 314 may include one or more conventional mechanisms that permit the operator to input information to system 120, such as a keyboard, a mouse, a pen, voice recognition and/or biometric mechanisms, etc.

Communication interface 316 may include any transceiver-like mechanism that enables system 120 to communicate with other devices and/or systems. For example, communication interface 316 may include a modem or an Ethernet interface to a network. Alternatively, communication interface 316 may include other mechanisms for communicating via a data network.

A system 120, consistent with the present invention, determines an optimal telephone capacity expansion threshold in response to processor 304 executing sequences of instructions contained in a computer-readable medium, such as memory 306. A computer-readable medium may include one or more storage devices or carrier waves. Instructions may be read into the computer-readable medium from another computer-readable medium or from a separate storage device. Execution of the sequences of instructions contained in the computer-readable medium causes processor 304 to perform the acts that will be described hereafter. In alternative embodiments, hard-wired circuitry may be used in place of or in combination with software instructions to implement the present invention. Thus, the present invention is not limited to any specific combination of hardware circuitry and software.

Optimization system 120 may be associated with one or more databases. The databases may be stored at system 120 (e.g., in memory 306 or storage device 310) or externally from system 120.

Figure 4A:
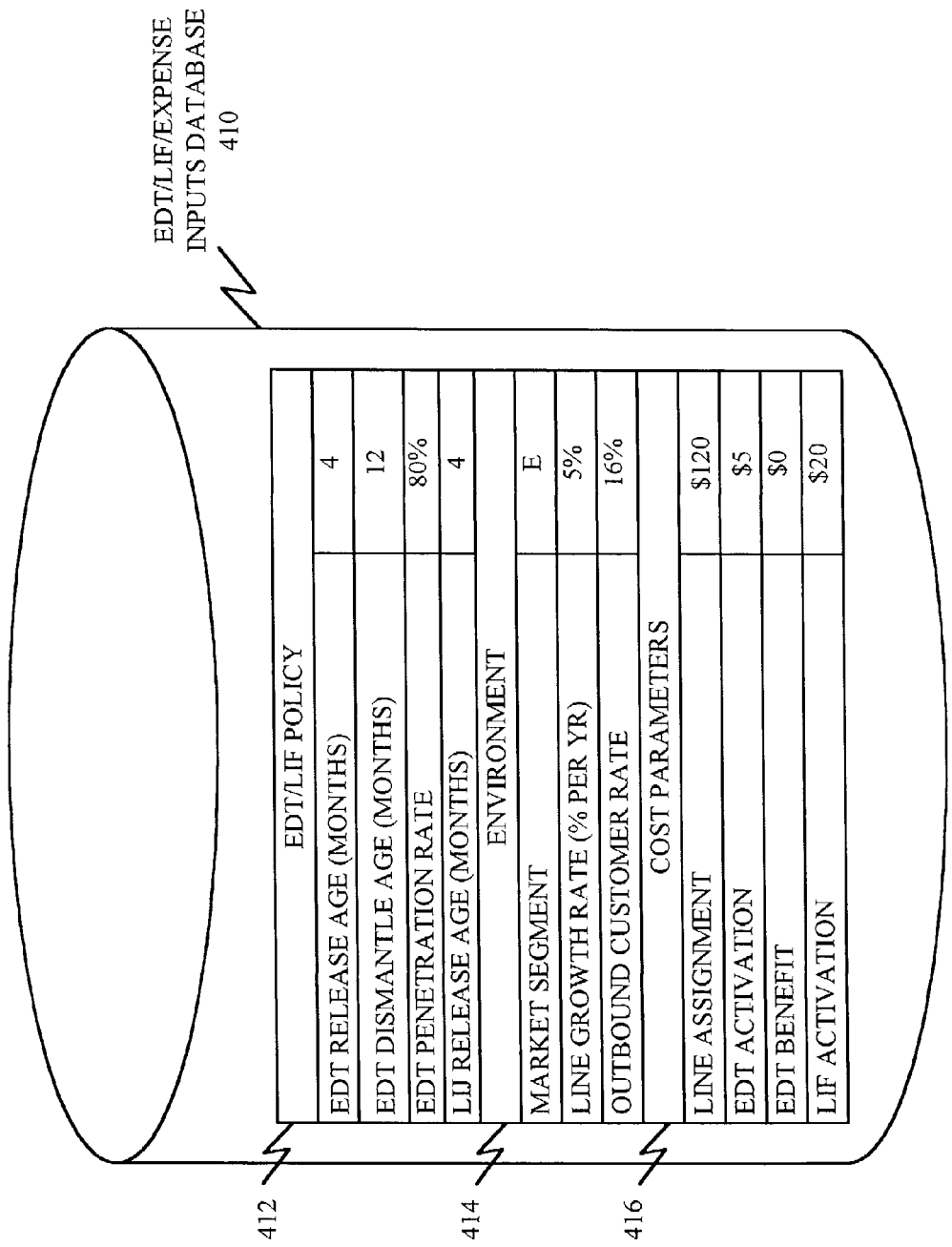
FIGS. 4A and 4B illustrate an exemplary database that may be associated with the system of FIG. 3.
Figure 4B:
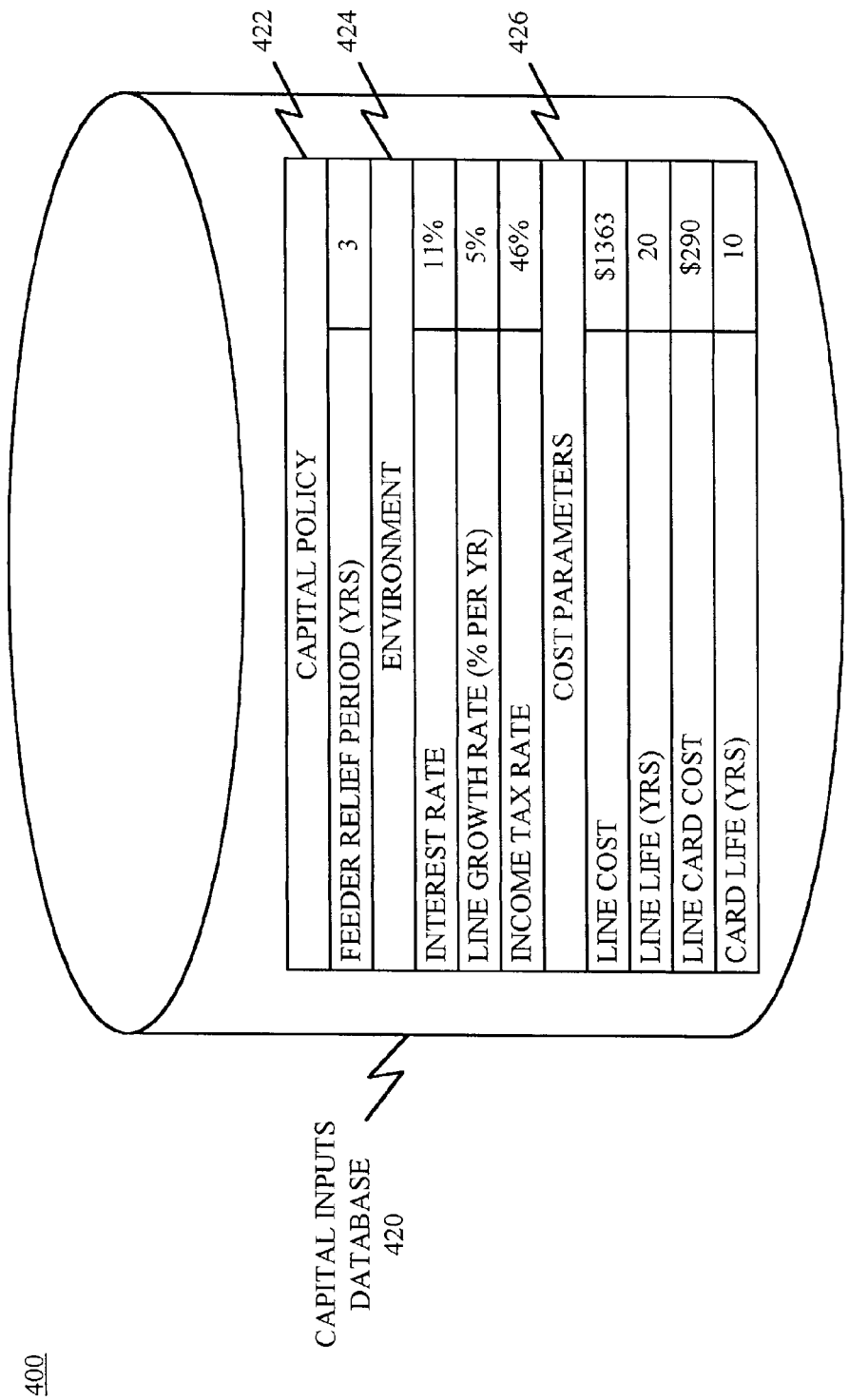

FIGS. 4A and 4B illustrate an exemplary database 400 that may be associated with the system of FIG. 3. As illustrated, database 400 may include two sub-databases 410, illustrated in FIG. 4A, and 420, illustrated in FIG. 4B, that store a group of entries that may be used to determine an optimal telephone line capacity expansion threshold for a particular inventory policy according to an implementation consistent with the present invention. While only two sub-databases are described, it will be appreciated that database 400 may consist of more than two sub-databases stored locally or external to system 120.

Database 410 may include entries corresponding to one or more EDT/LIF policies 412, environmental parameters 414, and cost parameters 416. EDT/LIF policy category 412 may include one or more policies for managing EDT and LIF lines. Fields within EDT/LIF policy category 412 may include an EDT release age field, an EDT dismantle age field, an EDT penetration rate field, and a LIJ release age field.

The EDT release age field may store a value (e.g., in months) that specifies how long a line is to be left in EDT status before it or parts of it may be used, if needed, for providing another type of service connection. The EDT dismantle age field may store a value (e.g., in months) that specifies how long a line is to be left in EDT status before it is dismantled. The EDT penetration rate field may store a value indicative of the percentage of outbound customers (i.e., the number of subscribers having telephone service disconnected) that have the disconnected line put into EDT status. The LIJ release age field may store a value (e.g., in months) that specifies how long a line is to be left in LIJ status before becoming available for other assignments.

Environmental parameters 414 may include fields for specifying a market segment, line growth rate, and an outbound customer rate. The market segment field may include a value that specifies whether the particular market is moderately competitive (M), highly competitive (H), or extremely competitive (E). The line growth rate field may store a value indicative of a percentage increase in the number of lines employed over a given period of time (e.g., over a year). The outbound customer rate field may store a value that specifies a rate at which subscribers' telephone service is disconnected.

Cost parameters category 416 may include fields for specifying a cost of a line assignment, a cost of an EDT activation, the benefit of providing EDT, and a cost of activating a LIF line for one or more central offices. The line assignment field may store a value that specifies the average cost of assigning a line when margins are not tight (e.g., about 85%) and EDT/LIJ/LIF are not available. The EDT activation field may store a value that specifies the average cost of placing a line in an EDT active status. The EDT benefit field may store a value indicative of the average revenue benefit to the market associated with having an active EDT line. The LIF activation field may store a value that specifies the average cost of placing a line in an LIF active status.

Database 420 may include entries corresponding to one or more capital policies 422, environmental parameters 424, and cost parameters 426. Capital policy category 422 may include policies for managing capital expenditures. A field within capital policy category 422 may include a feeder relief period field. The feeder relief period field may store a value (e.g., in years) indicative of the planned time between feeder plant 220 capacity expansion.

Environmental parameters 424 may include fields for specifying an interest rate, a line growth rate, and an income tax rate. The interest rate field may include a value that specifies the current interest rate. The line growth rate field may store a value indicative of a percentage increase in the number of lines employed for a certain period of time (e.g., over a year). The income tax field may include a value that specifies the current income tax rate.

Cost parameters category 426 may include fields for specifying a cost of a line, a life of a line, a cost of a line card, and a life of a line card. The line cost field may store a value that specifies the average capital cost of a line. The line life field may store a value that specifies the average life (e.g., in years) of a line. The line card cost field may store a value indicative of the average cost of a line card. The line card life field may store a value that specifies the average life (e.g., in years) of a line card.

Optimization system 120 may use all or a combination of the entries from database 400 to determine an optimal threshold for telephone line capacity expansion and evaluate a particular line management policy. Optimization system 120 may, in an implementation consistent with the present invention, use local data to determine the impact of policy changes to a particular central office or may, in another implementation consistent with the present invention, use data files to evaluate a particular EDT line policy or to determine optimal capacity expansion threshold for all central offices. The data files may, for example, be stored in database 400 or received from one or more central offices via network 130.

In operation, optimization system 120 may also use a group of complex models to determine fill rates for a given policy. Optimization system 120 may, for example, use a model of business and residence vacancies, feeder plant inventory status and transitions among states, expense/risk as a function of fill rate (i.e., the rate at which telephone line capacity is utilized), and capital costs and expenses.

Figure 5:
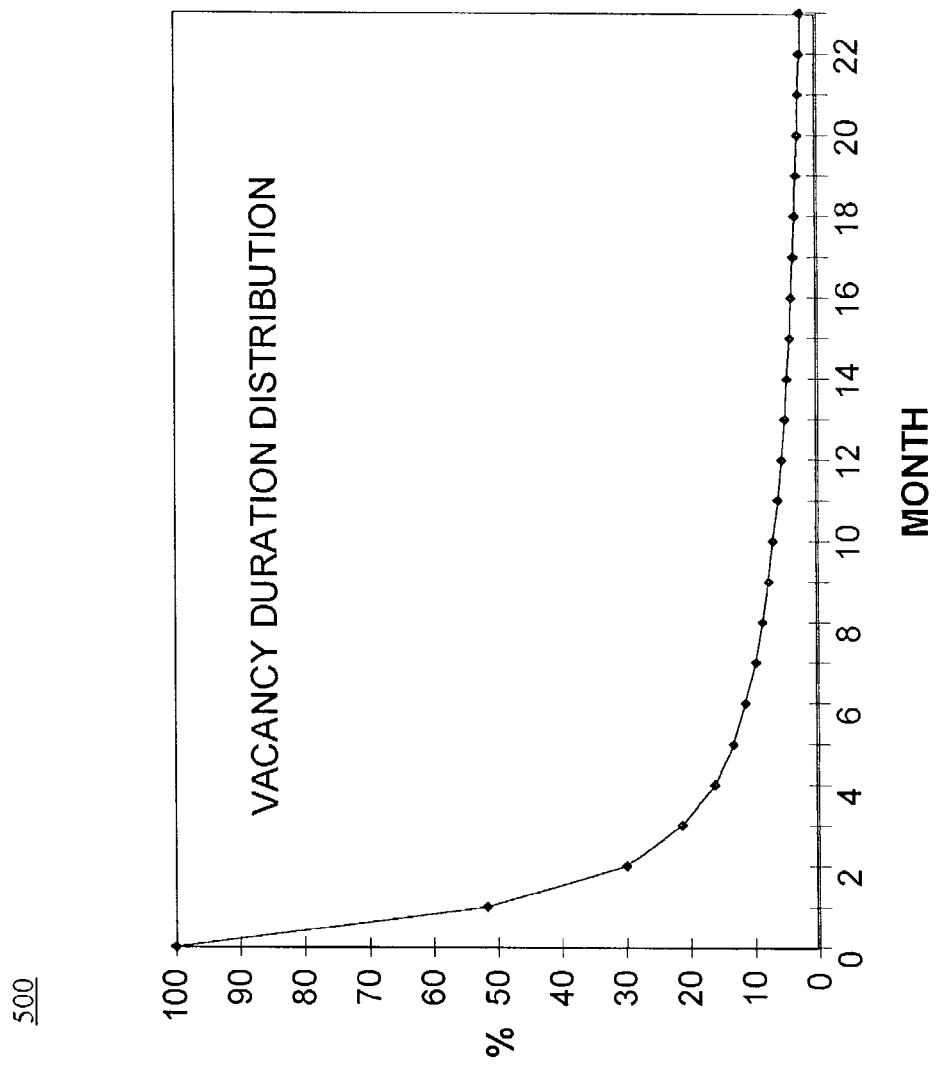
FIGS. 5–8 illustrate exemplary models that may be used by the system of FIG. 3 for determining the optimal capacity expansion threshold.

FIG. 5 illustrates an exemplary vacancy duration model 500 that may be used by optimization system 120. As illustrated, the percentage of vacant lines exponentially decreases as vacancy duration increases. This vacancy model 500 may be used to model customer turnover (i.e., the number of customers having telephone service connected/disconnected). This model of customer turnover drives queuing network model 600 illustrated in FIG. 6.

Figure 6:
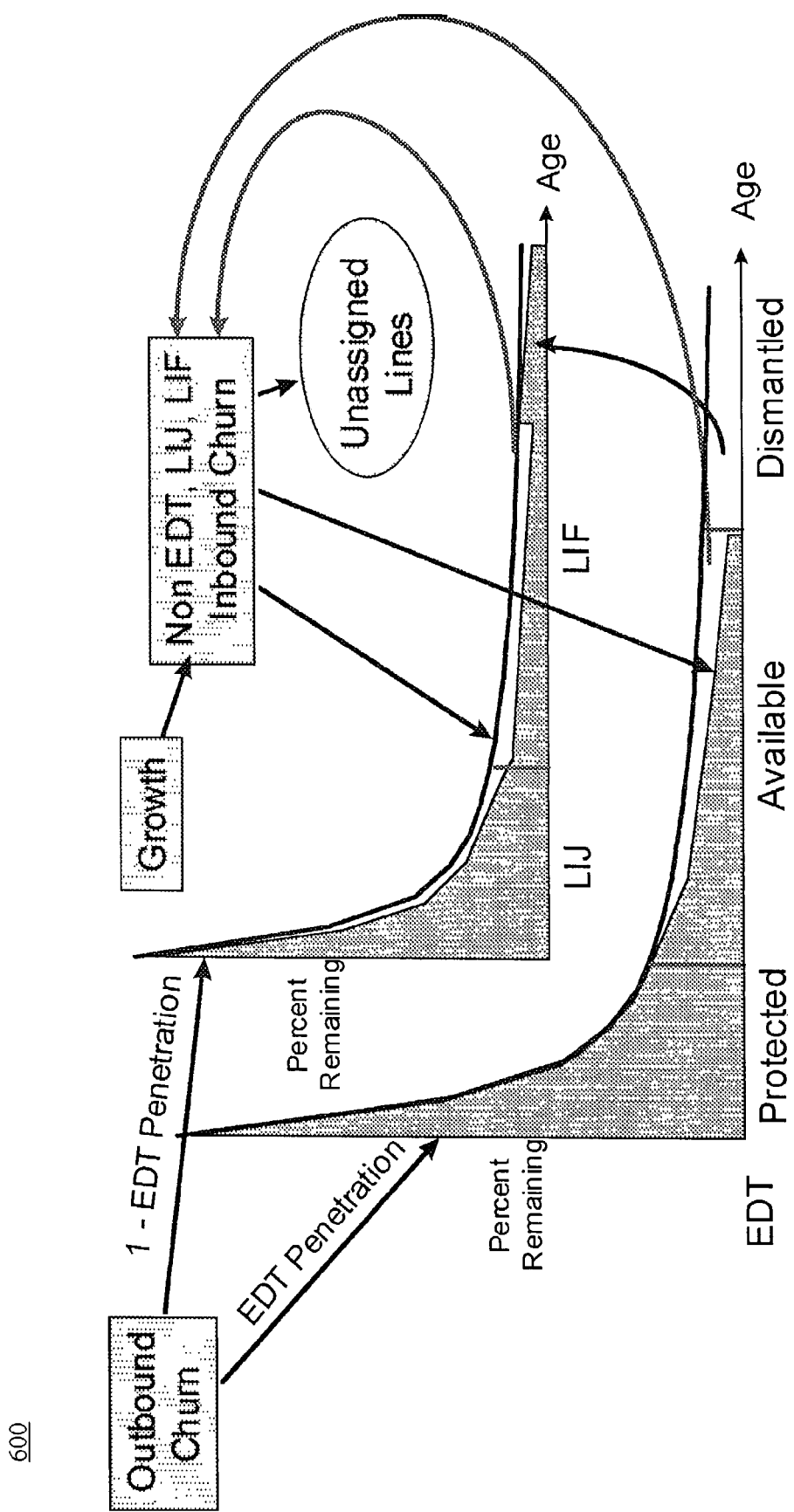

Depending on the inventory management policies, model 600 may determine the expected amount of inventory in various states, and the transitions among states. Capital costs, in general, depend on the amount of inventory in each state, and expenses depend on the types of transitions among states. In FIG. 6, outbound churn refers to the number of customers having telephone service disconnected, thereby increasing the number of EDT lines. Inbound churn refers to the number of customers having telephone service connected thereby decreasing the number of EDT lines.

The queues in FIG. 6 consist of the inventories of feeder cables (and line cards) in various states and ages, e.g. LIJ, LIF, protected EDT, and released EDT. The arrivals and departures from the queues are triggered by service disconnects and service connects (i.e., outbound and inbound churn). The types of transitions among the queues determine the expenses incurred, and the sizes of the various inventories determine the capital costs. For example, when a customer is disconnected, either an EDT line or LIJ line is created. As EDT lines age, they become available for use and if the business or residence remains vacant long enough, they may be dismantled to LIF status. When an EDT line is dismantled, the line card is available for use elsewhere, reducing capital costs. If the EDT line is dismantled, or it is taken for use for a different location while it is in available status, then the expense to reconnect the original location may be higher than if the EDT is in place for the reconnect. Steady state solutions among these queues may be used to determine annual costs.

Figure 7:
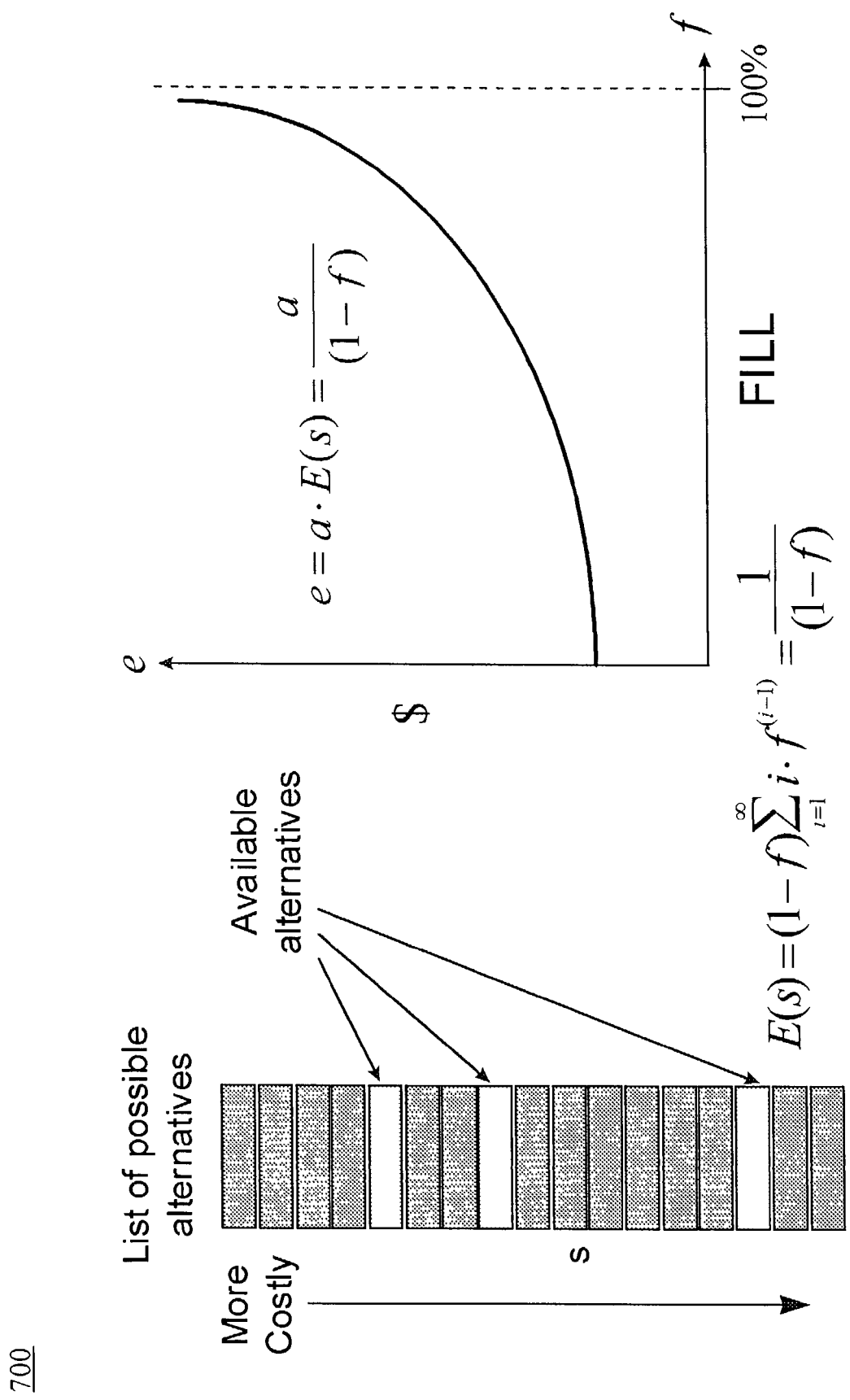

Increased feeder plant fill rate increases provisioning costs and the risk of not having enough capacity to meet customer demands. A model, consistent with the present invention, of this was developed based on theory, and calibrated using collective expertise contained in policies and practice. FIG. 7 illustrates an exemplary model 700 of fill compared to expense/risk. As illustrated, as the fill rate of the feeder plant increases, expenses increase. This may, for example, be due to the fact that as the fill rate of the feeder plant increases, only the more expensive connection alternatives may remain, thereby causing an increase in expenses.

Figure 8:
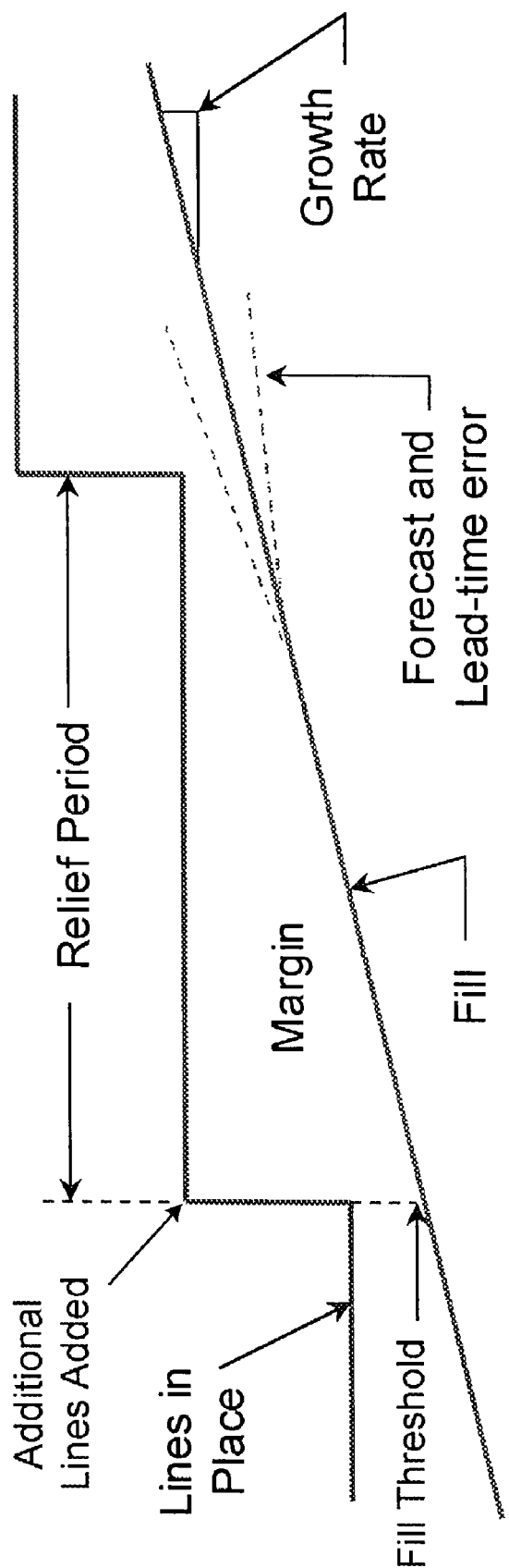

Since the actual fill rate changes as customer growth uses up existing facilities, capital costs and expenses may be averaged over the capacity relief/exhaust cycle as illustrated in FIG. 8. Capital costs and expenses may also be averaged over the forecast error variance. Optimization system 120 may incorporate all of these models into a routine for determining an optimal line capacity expansion threshold.

Exemplary Process

Figure 9:
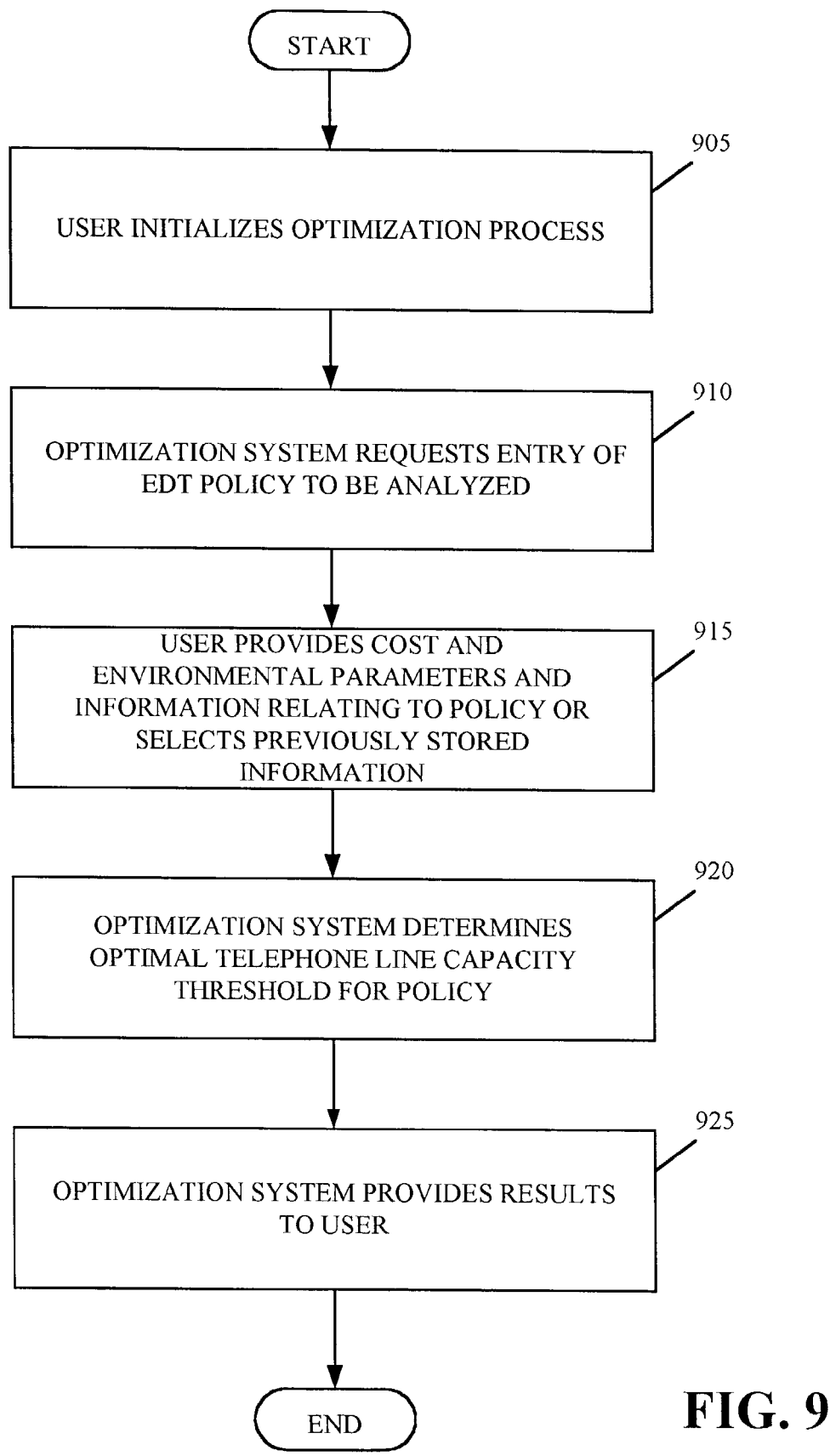
FIG. 9 illustrates an exemplary process, consistent with the present invention, for determining an optimal threshold for increasing telephone line capacity for a line management policy.

FIG. 9 illustrates an exemplary process, consistent with the present invention, for determining an optimal threshold for increasing telephone line capacity for a line management policy, such as an EDT policy. Processing may begin with a user (e.g., a network operator) initializing an optimization process at optimization system 120 [act 905]. This initialization procedure may involve the user double-clicking an icon on the screen of optimization system 120, typing in a command, or some other well-known technique. The initialization procedure may also involve some type of well-known log-in process in which the user enters an identifier and password that are authenticated by optimization system 120.

Optimization system 120 may then request the user to provide an EDT policy to be analyzed [act 910]. Optimization system 120 may, for example, provide the user with exemplary graphical user interface 1000 illustrated in FIG. 10. As illustrated, graphical user interface 1000 may request entry of cost parameters 1010, environmental parameters 1020, and information relating to a particular line policy, such as an EDT and/or LIJ policy, of interest 1030. The user may manually enter this information or may have the information entered automatically from, for example, database 400 or from one or more other central offices in network 130 [act 915].

Based on these inputs, optimization system 120 may determine an optimal threshold for increasing telephone line capacity (or trigger fill rate) for the line management policy [act 920]. As described above, optimization system 120 may use one or more of the complex models described in relation to FIGS. 5–8 above to determine this threshold.

Optimization system 120 may then provide the results to the user [act 925]. The results, as illustrated in FIG. 10, may include, for example, cost results 1040, customer turnover (or churn) results 1050, and outlay implications 1060 for the particular line management policy being analyzed.

Figure 10:
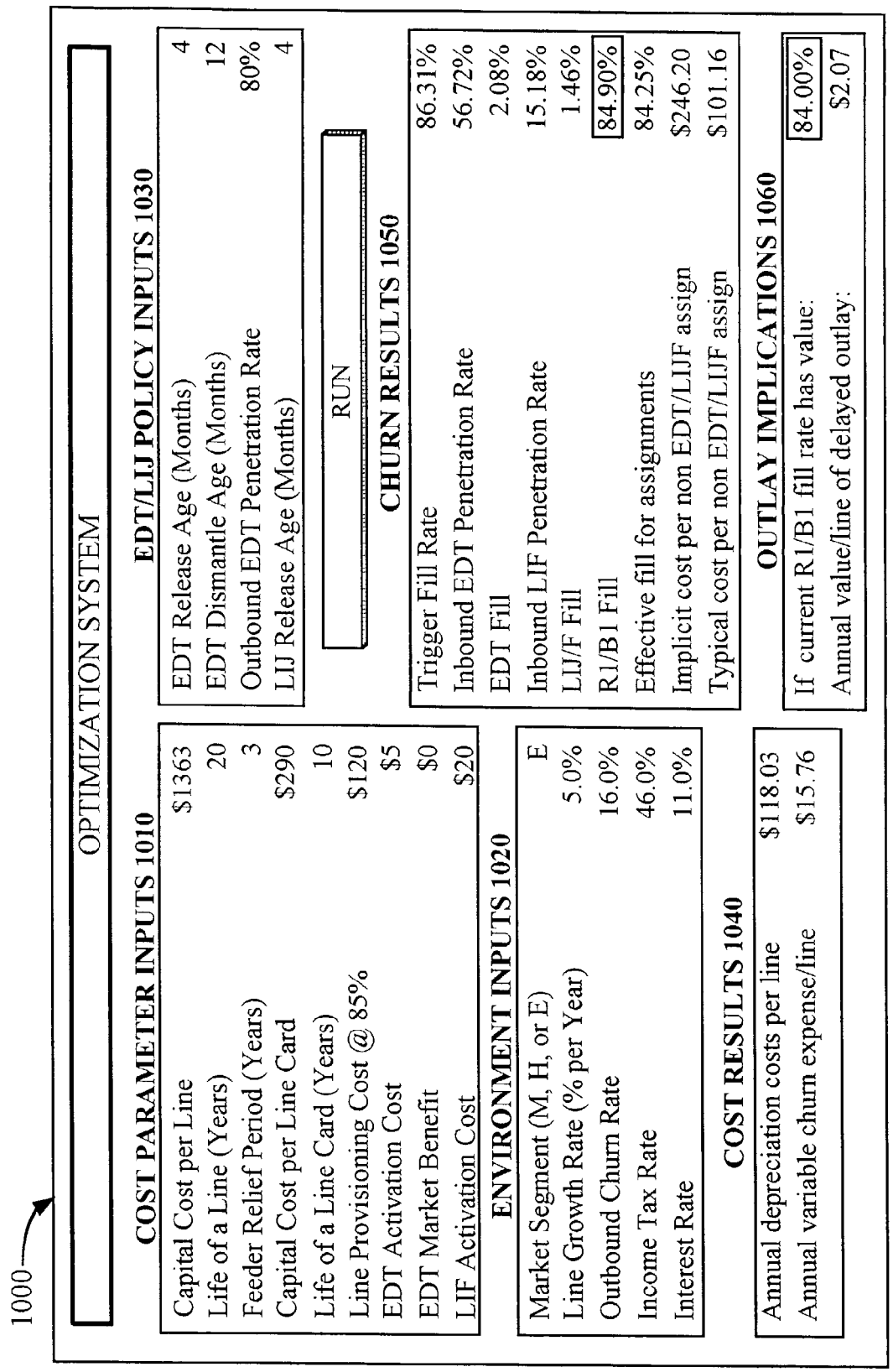
FIG. 10 illustrates an exemplary graphical user interface that may be provided to a user of the system of FIG. 3.

As illustrated in FIG. 10, cost results 1040 may include, for example, annual depreciation costs per line and annual variable customer turnover (or churn) expense per line. The annual depreciation costs per line output represents the estimated annualized capital cost per revenue producing line. The annual variable churn expense per line output represents the estimated annualized margin sensitive expenses per revenue producing line.

Churn results 1050 may include a trigger fill rate, inbound EDT penetration rate, an EDT fill output, an inbound LIF penetration rate, a LIJ/F fill output, an effective fill for assignments output, an implicit cost per non EDT/LIJF assignment output, and a typical cost per non EDT/LIJF assignment output. As described above, the trigger fill rate represents an optimal threshold for increasing telephone line capacity for the line management policy being investigated. The inbound EDT penetration rate represents the percentage of service activations for which EDT is in place.

The EDT fill output represents the EDT line contribution to the trigger fill. The inbound LIF penetration rate represents the percentage of service activations for which LIF is in place. The LIJ/F fill output represents the LIJ/F line contribution to trigger fill. The R1/B1 fill represents the percentage of lines that are active residential or business telephone lines at the trigger fill rate. The effective fill for assignments output represents the average fill at which service activations take place. The implicit cost per non EDT/LIJF assignment output represents the implied cost of activating a line when EDT/LIJ/LIF are not in place. The typical cost per non EDT/LIJF assignment output represents the average cost of activating a line when EDT/LIJ/LIF are not in place. The cost outlay implications of the optimized trigger fill rate can be evaluated by entering the R1/B1 fill for the current (non-optimized) trigger fill rate, and the annual cost savings per line will be displayed.

Table 1 provides the equations for determining the outputs of the optimization system 120. Table 2 provides definitions for the variables used in Table 1.

TABLE 1

Optimization System Outputs

| OUTPUT RESULTS | EQUATION |
|---|---|
| Cost Results | |
| Annual depreciation costs per line | capital+LineCard |
| Annual variable churn expense/line | expense |
| Churn Results | |
| Trigger Fill Rate | WFill+Queue1 |
| Inbound EDT Penetration Rate | (lambda−etae−ftildat2)/(inbound) |
| EDT Fill | AdEDTfill |
| Inbound LIF Penetration Rate | (Llambda−etae−ftildat2)/inbound |
| LIJ/F Fill | AdLIFfill |
| R1/B1 fill | 0.848987722299378 |
| Effective fill for assignments | mPFillm |
| Implicit cost per non EDT/LIJF assign | AssCost85*0.15*(0.5*(rg1p/(rg1p−1)* LN((rg1p−Pfillp)/(rg1p*(1−Pfillp)))/Pfillp)+ 0.5*(rg1/(rg1−1)*LN((rg1−Pfillm)/ (rg1*(1−Pfillm)))/Pfillm)) |
| Typical cost per non EDT/LIJF assign | AssCost85*0.15*(0.5*(rg1p/(rg1p−1)* LN((rg1p−mPFill)/(rg1p*(1−mPFill)))/mPFill)+ 0.5*(rg1/(rg1−1)*LN((rg1−mPFillm)/ (rg1*(1−mPFillm)))/mPFillm)) |
| Outlay Implications | |
| If current R1/B1 fill rate has value: | 0.84 |
| Annual value/line of delayed outlay: | dFreeCash*(OldFill)−dFreeCash*(WFill) |

TABLE 2

Variable Definitions

| VARIABLE | DEFINITION |
| --- | --- |
| Relief | Feeder Relief Period input |
| Capcost | Capital Cost Per Line input |
| Life | Life of a Line Card input |
| CardCost | Capital Cost per Line Card input |
| AssCost85 | Line Provisioning Cost @ 85% input |
| EDTCost | EDT Activation Cost input |
| EDTBen | EDT Market Benefit input |
| LIFCost | LIF Activation Cost input |
| Seg | Market Segment input |
| growth | Line Growth Rate input |
| churn | Outbound Churn Rate input |
| tax | Income Tax Rate input |
| interest | Interest Rate input |
| RelAge | EDT Release Age input |
| Disage | EDT Dismantle Age input |
| OEDTpen | Outbound EDT Penetration Rate input |
| LIJAge | LIJ Release Age input |
| WFill | R1/B1 Fill input |
| OldFill | If Current R1/B1 Fill Rate has Value input |
| capital | AnnCap*LumpFact/WFill |
| AnnCap | Capcost/Life |
| dAnnCap | $-(1-\text{tax})*\text{AnnCap}*\text{LumpFact}/(\text{WFill})^2$ |
| dFreeCash | $-(\text{Relief}*\text{Capcost}*\text{interest}^2*(1+\text{interest})^{(\text{Relief}-1)}/(((1+\text{interest})^{\text{Relief}}-1)*(\text{WFill})^2)$ |
| tota | (1−WFill) |
| expense | 0.5*AEx1+0.5*AEx2 |
| PrGEn | (((1−Propslow−Propmist)/FastRate)*EXP(−FastRate*RelAge)+(Propslow/SlowRate)*EXP(−SlowRate*RelAge)+(Propmist/MisRate)*EXP(−MisRate*RelAge))/bfratio |
| Queue1 | (1−PrGEn)*churn*OEDTpen*WFill*(bfratio/12) |
| Queue2 | $(\text{Eterm}-\text{SQRT}(\text{Eterm}^2 -4*\text{Q2A}*\text{tota}))/2$ |
| dExp | (0.5*dAE1+0.5*dAE2)*(1−tax) |
| dTotal | dAnnCap+dFreeCash+dExp+dAnnCard |
| Propslow | 0.198 |
| Propmist | 0.059 |
| FastRate | 0.916 |
| SlowRate | 0.191 |
| MisRate | 0.04 |
| bfratio | ((1−Propslow−Propmist)/FastRate+Propslow/SlowRate+Propmist/MisRate) |
| EDTfill | OEDTpen*churn*WFill*(bfratio/12) |
| tail | IF(Disage<RelAge,RelAge,Disage) |
| PrGEtail | (((1−Propslow−Propmist)/FastRate)*EXP(−FastRate*tail)+(Propslow/SlowRate)*EXP(−SlowRate*tail)+(Propmist/MisRate)*EXP(−MisRate*tail)/bfratio |
| err2 | (1+ 1*(Seg="m")+2*(Seg="h")+3*(Seg="e"))*var*(1/5)*0.06 |
| total | expense+capital+LineCard |
| lambda | churn*WFill*OEDTpen/12 |
| mubar | 1/bfratio |
| Cedt | (growth/12) |
| Q2A | (lambda*EXP(−FastRate*RelAge))*((1−Propslow−Propmist)/FastRate)*(1−EXP(−FastRate*(tail−RelAge))) + (lambda*EXP(−SlowRate*RelAge))*(Propslow/SlowRate)*(1−EXP(−SlowRate*(tail−RelAge)))+ (lambda*EXP(−MisRate*RelAge))*(Propmist/MisRate)*(1−EXP(−MisRate*(tail−RelAge))) |
| Q2K | (npro1/nprobar)*((1−Propslow−Propmist)/FastRate)*(1−EXP(−FastRate*(tail−RelAge)))+(npro2/nprobar)*(Propslow/SlowRate)*(1−EXP(−SlowRate*(tail−RelAge)))+(npro3/nprobar)*(Propmist/MisRate)*(1−EXP(−MisRate*(rail−RelAge))) |
| Eterm | Q2K*ceda+tota+Q2A |
| frelage | (1−Propslow−Propmist)8EXP(−FastRate*RelAge)+Propslow*EXP(−SlowRate*RelAge)+Propmist*EXP(−MisRate*RelAge) |
| AdEDTfill | Queue1+Queue2 |
| AvEDTfill | Queue2 |
| AnnCard | CardCost/CardLife |
| LineCard | AnnCard*LumpFact*(WFill+AdEDTfill+LIJfill)/WFill |
| dAnnCard | $(1-\text{tax})*\text{AnnCard}*\text{LumpFact}*(1/\text{WFill}-(\text{WFill}+\text{AdEDTfill}+\text{LIJfill})/\text{WFill}^2)$ |
| LumpFact | LN(1+Relief*growth)*(1+Relief*growth)/(Relief*growth) |
| dAvgExp | (1−Newpen−LIFPen)*0.15*(churn+growth)*((AssCost85*rg1)/(WFill*rg))*((LN((rg1*(1−WFill))/(rg1−WFill)))/WFill)+9rg/((1−WFill)*(rg1−WFill)))) |
| rg1 | (1+Relief*growth) |
| rg | rg1−1 |

TABLE 2-continued

Variable Definitions

| VARIABLE | DEFINITION |
|---|---|
| err | (1+ 1*(Seg="m")+2*(Seg="h")+3*(Seg="e"))*var*(4/5) |
| gplus | growth + growth*err +err2 |
| gminus | MAX(0.0001, growth–growth*err–err2) |
| dAE1 | (1–Newpen–LIFPen)*0.15*(churn+growth)*((AssCost85*rg1p)/(Pfillp*(rg1p–1)))*((LN((rg1p*(1–Pfillp))/(rg1p–Pfillp))/Pfillp)+((rg1p–1)/((1–Pfillp)*(rg1p–Pfillp)))) |
| dAE2 | (1–Newpen–LIFPen)*0.15*(churn+growth)*((AssCost85*rg1)/(Pfillm*(rg1–1)))*((LN((rg1*(1–Pfillm))/(rg1–Pfillm)/Pfillm)+((rg1–1)/((1–Pfillm)*(rg1–Pfillm)))) |
| rg1p | (TPFill<=infl)*(1+Relief*growth)+(TPFill>infl)*(1+Relief*growth)*(infl)/TPFill |
| rgp | rg1p–1 |
| Pfillp | (TPFill<=infl)*TPFill+(TPFill>infl)*(1–(1–infl)*((1–infl)/(1–infl+TPFill–infl))^4) |
| Pfillm | WFill*((1+gminus*(RLT/12))/(1+growth*(RLT/12)))+(AdEDTfill–AvEDTFill)+(AdLIFfill–AvLIFfill) |
| Pfill | WFill+(AdEDTfill–AvEDTFill)+(AdLIFfill–AvLIFfill) |
| TPFill | WFill*((1+gplus*(RLT/12))/(1+growth*(RLT/12)))+(AdEDTfill–AvEDTFill)+(AdLIFfill–AvLIFfill) |
| AEx1 | (1–Newpen–LIFPen)*AssCost85*0.15*(churn+growth)*(rg1p/(rg1p–1)*LN((rg1p–Pfillp)/(rg1p*(1–Pfillp)))/Pfillp+Newpen*(EDTCost–EDTBen)*(churn+growth)+LIFPen*(LIFCost)*(churn+growth) |
| AEx2 | (1–Newpen–LIFPen)*AssCost85*0.15*(churn+growth)*(rg1/rg1–1)*LN((rg1–Pfillm)/(rg1*(1–Pfillm)))/Pfillm+Newpen*(EDTCost–EDTBen)*(churn+growth)+LIFPen*(LIFCost)*(churn+growth) |
| AEx | (1–Newpen–LIFPen)*AssCost85*0.15*(churn+growth)*(rg1/(rg1–1)*LN((rg1–PFill)/(rg1*(1–Pfill)))/PFill+Newpen*(EDTCost–EDTBen)*(churn+growth)+LIFPen*(LIFCost)*(churn+growth) |
| infl | 0.999 |
| RLT | 6 |
| LIFJFill | (1–OEDTpen)*churn*WFill*(bfratio/12) |
| Lbfratio | ((1–ProLSlow–ProLMist)/FastRate+ProLSlow/SlowRate+ProLMist/MisRate) |
| ProLSlow | Propslow/((1–OEDTpen)*(1–Propslow–Propmist) + Propslow + Propmist) |
| ProLMist | Propmist/((1–OEDTpen)*(1–Propslow–Propmist) + Propslow + Propmist) |
| Lqueue1 | (lterm–SQRT(lterm^2–4*LQA*tota))/2 |
| Lpolicy2 | PrGEage |
| lterm | LQK*clif +tota+LQA |
| LQA | (Llambda)*((1–Propslow–Propmist)/FastRate) + (Llambda)*(Propslow/SlowRate)+ (Llambda)*(Propmist/MisRate) + queue3 |
| LQK | (lnpro1/lnprobar)*((1–Propslow–Propmist)/FastRate) + (lnpro2/lnprobar)*(Propslow/SlowRate)+ (lnpro3/lnprobar)*(Propmist/MisRate) |
| PrGEage | (((1–ProLSlow–ProLMist)/FastRate)*EXP(–FastRate*LIJAge)+(ProLSlow/SlowRate)*EXP(–SlowRate*LIJAge)+ (ProLMist/MisRate)*EXP(–MisRate*LIJAge))/Lbfratio |
| Llambda | churn*WFill*(1–OEDTpen)/12 |
| clif | (growth/12) |
| AdLIFfill | Lqueue1 |
| AvLIFfill | Lqueue1 |
| LIJfill | Lqueue1*(1–LPolicy2) |
| Var | 9*0.167 |
| merr | (1+ 0)*var*(4/5) |
| merr2 | (1+ 0)8var*(1/5)*0.06 |
| mgplus | growth + growth*merr +merr2 |
| mPFill | WFill*((1+mgplus*(RLT/12))/(1+growth*(RLT/12)))+(AdEDTfill–AvEDTFill)+(AdLIFfill–AvLIFfill) |
| mgminus | MAX(0.0001, growth–grown*err–err2) |
| mPFillm | WFill*((1+gminus*(RLT/12))/1+growth*(RLT/12)))+(AdEDTfill–AvEDTFill)+(AdLIFfill–AvLIFfill) |
| lfrelage | (1–ProLSlow–ProLMist)*EXP(–FastRate*LIJAge)+ProLSlow*EXP(–SlowRate*LIJAge)+ProLMist*EXP(–MisRate*LIJAge) |
| ftail | (1–ProLSlow–ProLMist)*EXP(–FastRate8tail)+ProLSlow*EXP(–SlowRate*tail)+ProLMist8EXP(–MisRate*tail) |
| rhoe | Queue2/tota |
| etae | rhoe*cedt/(1–rhoe) |
| queue3 | ((1–Propslow–Propmist)/FastRate)*(lambda*EXP(–FastRate*tail)–(mubar/FastRate)*etae*EXP(–FastRate*(tail–RelAge)))+(Propslow/SlowRate)*(lambda*EXP(–SlowRate*tail)–(mubar/SlowRate)*etae*EXP(–SlowRate*(tail– |

TABLE 2-continued

Variable Definitions

| VARIABLE | DEFINITION |
| --- | --- |
|  | RelAge)))+(Propmist/MisRate)*(lambda*EXP(-MisRate*tail)-(mubar/MisRate)*etae*EXP(-MisRate*(tail-RelAge))) |
| ftildat2 | ((1-Propslow-Propmist))*(lambda*EXP(-FastRate*tail)-(mubar/FastRate)*etae*EXP(-FastRate*(tail-RelAge)))+(Propslow)*(lambda*EXP(-SlowRate*tail)-(mubar/SlowRate)*etae*EXP(-SlowRate*(tail-RelAge)))+(Propmist)*(lambda*EXP(-MisRate*tail)-(mubar/MisRate)*etae*EXP(-MisRate*(tail-RelAge))) |
| rho1 | Lqueue1/tota |
| eta1 | clif*rho1/(1-rho1) |
| inbound | WFill*(churn+growth)/12 |
| npro1 | ((1-Propslow-Propmist)/FastRate)*EXP(-FastRate*RelAge)-((1-Propslow-Propmist)/FastRate)*EXP(-FastRate*tail) |
| npro2 | (Propslow/SlowRate)*EXP(-SlowRate*RelAge)-(Propslow/SlowRate)*EXP(-SlowRate*tail) |
| npro3 | (Propmist/MisRate)*EXP(-MisRate*RelAge)-(Propmist/MisRate)*EXP(-MisRate*tail) |
| nprobar | npro1+npro2+npro3 + (npro1+npro2+npro3=0)*1 |
| lnpro1 | ((1-Propslow-Propmist)/FastRate) |
| lnpro2 | (Propslow/SlowRate) |
| lnpro3 | (Propmist/MisRate) |
| lnprobar | lnpro1+lnpro2+lnpro3 + (lnpro1+lnpro2+lnpro3=0)*1 |

Because the number of lines provided by a typical telephone service provider may be on the order of 20 million, a small improvement in the utilization of available lines can have a large economic benefit to the service provider. For example, increasing the average fill rate by about 1%, e.g., from 89% to 90%, can reduce the annual capital costs per revenue producing line by about $2.00. This amounts to a savings of $40 million a year in a capital costs over the typical 20 year life of a line. At times when cash is tight, the benefit of avoiding capital outlay is very important. This improved utilization provides a reduction in capital outlay. Of course, there is an offsetting increase in expenses that depends on the fill. The optimization system 120 minimizes total costs by finding the point at which the reduction in capital costs is exactly offset by the increase in expenses. Using the optimization system 120 to determine costs at every central office under old and proposed policies provides estimates of savings under the proposed policies.

Moreover, since the optimization system 120 reduces the capital equipment requirements of providing service, it has a positive ecological environmental impact in that it reduces the amount of equipment that needs to be manufactured and installed. This reduces energy consumption, raw material consumption and emissions associated with manufacturing, as well as with installation.

CONCLUSION

A system and method, consistent with the present invention, determine an optimal threshold for increasing telephone line capacity in a telecommunications network. The system may use local data to determine the impact of policy changes to a particular central office, or may use data files to evaluate a particular line management policy or to determine the optimal threshold for all central offices in the telecommunications network.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 9, the order of the acts may be varied in other implementations consistent with the present invention. Moreover, non-dependent acts may be performed in parallel.

It will be appreciated that the present invention can be implemented in hardware, software, or a combination of hardware and software. Thus, the present invention is not limited to any specific combination of hardware circuitry and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A system that determines an optimal threshold at which telephone line capacity should be expanded, comprising:
    a memory configured to store instructions and parameters, the parameters relating to at least one line management policy; and
    a processor configured to execute the instructions to receive the parameters and determine the optimal threshold based on the parameters;
    wherein the parameters include at least one of an express dialtone release age indication, an express dialtone dismantle age indication, an outbound express dialtone penetration rate, and a left-in-jumper release age indication.

2. The system of claim 1 wherein, when determining, the processor is configured to determine the optimal threshold for a single central office.

3. The system of claim 1 wherein, when determining, the processor is configured to determine the optimal threshold for a group of central offices.

4. The system of claim 1 wherein the parameters further relate to environmental and cost parameters.

5. The system of claim 4 wherein the environmental parameters include at least one of a market segment indication, a line growth rate indication, an outbound customer rate, an interest rate, and an income tax rate.

6. The system of claim 4 wherein the cost parameters include at least one of a capital cost per line indication, an average life of a telephone line indication, a feeder plant relief period indication, a capital cost per telephone line card indication, a life of a line card indication, a telephone line provisioning cost indication, an express dialtone activation cost indication, an express dialtone market benefit indication, and a left-in-frame activation cost indication.

7. The system of claim 1 wherein, when determining, the processor is configured to determine the optimal threshold using at least one of vacancy duration information, feeder plant inventory status information and transitions among states information, expense/risk in relation to a telephone line fill rate information, and a capital costs and expenses information.

8. A system for determining an optimal threshold at which telephone line capacity should be increased, the system comprising:
   means for receiving a group of parameters, the parameters relating to at least one of a telephone line management policy, environmental parameters, and cost parameters; and
   means for determining the optimal threshold based on the parameters;
   wherein the parameters include at least one of an express dialtone release age indication, an express dialtone dismantle age indication, an outbound express dialtone penetration rate, and a left-in-jumper release age indication.

9. A computer-readable medium containing instructions for causing one or more processors to perform a method for determining a threshold for increasing telephone line capacity, the method comprising:
   receiving a group of parameters, the parameters relating to at least one of a telephone line management policy, environmental parameters, and cost parameters; and
   determining the threshold based on the parameters;
   wherein the parameters include at least one of an express dialtone release age indication, an express dialtone dismantle age indication, an outbound express dialtone penetration rate, and a left-in-jumper release age indication.

10. The computer-readable medium of claim 9 wherein the determining includes:
   determining the threshold using at least one of vacancy duration information, feeder plant inventory status information and transitions among states information, expense/risk in relation to a telephone line fill rate information, and a capital costs and expenses information.

11. A method for determining a threshold for increasing telephone line capacity, comprising:
   receiving a group of parameters, the parameters relating to at least one of a telephone line management policy, environmental parameters, and cost parameters; and
   determining the threshold based on the parameters;
   wherein the parameters relating to a telephone line management policy include at least one of an express dialtone release age indication, an express dialtone dismantle age indication, an outbound express dialtone penetration rate, and a left-in-jumper release age indication.

12. The method of claim 11 wherein the environmental parameters include at least one of a market segment indication, a line growth rate indication, an outbound customer rate, an interest rate, and an income tax rate.

13. The method of claim 11 wherein the cost parameters include at least one of a capital cost per line indication, an average life of a telephone line indication, a feeder plant relief period indication, a capital cost per telephone line card indication, a life of a line card indication, a telephone line provisioning cost indication, an express dialtone activation cost indication, an express dialtone market benefit indication, and a left-in-frame activation cost indication.

14. The method of claim 11 wherein the determining includes:
   determining the threshold using at least one of vacancy duration information, feeder plant inventory status information and transitions among states information, expense/risk in relation to a telephone line fill rate information, and a capital costs and expenses information.

15. The method of claim 11 further comprising:
   controlling telephone line provisioning based on the determined threshold.

16. The method of claim 11 further comprising:
   evaluating the telephone line management policy based on the determining.

17. A graphical user interface for providing data regarding telephone line deployment, comprising:
   a first section configured to allow a user to enter cost parameters;
   a second section configured to allow a user to enter environmental parameters;
   a third section configured to allow a user to enter data relating to a telephone line management policy;
   a fourth section configured to output cost results;
   a fifth section configured to output customer turnover results; and
   a sixth section configured to output outlay implication results;
   wherein the third section includes at least one of an express dialtone release age indication input, an express dialtone dismantle age indication input, an outbound express dialtone penetration rate input, and a left-in-jumper release age indication input.

18. The graphical user interface of claim 17 wherein the first section includes at least one of a capital cost per line indication input, an average life of a telephone line indication input, a feeder plant relief period indication input, a capital cost per telephone line card indication input, a life of a line card indication input, a telephone line provisioning cost indication input, an express dialtone activation cost indication input, an express dialtone market benefit indication input, and a left-in-frame activation cost indication input.

19. The graphical user interface of claim 17 wherein the second section includes at least one of a market segment indication input, a line growth rate indication input, an outbound customer rate input, an interest rate input, and an income tax rate input.

20. The graphical user interface of claim 17 wherein the fourth section includes at least one of an annual depreciation cost per telephone line output and an annual variable customer turnover expense per line output.

21. The graphical user interface of claim 17 wherein the fifth section includes at least one of a telephone line capacity threshold output, an inbound express dialtone (EDT) penetration rate output, an EDT fill output, an inbound left-in-frame (LIF) penetration rate output, a left-in-jumper (LIJ)/LIF fill output, an effective fill for assignments output, an implicit cost per non EDT/LIJ/LIF assignment output, and a typical cost per non EDT/LIJ/LIF assignment output.

22. The graphical user interface of claim 17 wherein the sixth section includes an annual value per line of delayed outlay output.

* * * * *